United States Patent [19]

Knez, Jr.

[11] Patent Number: 5,183,213

[45] Date of Patent: Feb. 2, 1993

[54] METHOD FOR RECYCLING WALLBOARD

[75] Inventor: John S. Knez, Jr., West Linn, Oreg.

[73] Assignee: Knez Building Materials Company, Tigard, Oreg.

[21] Appl. No.: 737,997

[22] Filed: Jul. 30, 1991

[51] Int. Cl.⁵ .............................................. B02C 17/04
[52] U.S. Cl. ..................................... 241/24; 241/176;
241/183; 241/DIG. 38
[58] Field of Search ................ 241/24, 30, 176, 299, 241/79, 183, DIG. 38

[56] References Cited

U.S. PATENT DOCUMENTS

| 981,445 | 1/1911 | Martin et al. |
|---|---|---|
| 1,516,913 | 11/1924 | Cramm . |
| 2,600,508 | 6/1952 | Lehman ............................ 241/79 X |
| 3,727,846 | 4/1973 | Rader ............................ 241/243 X |
| 3,749,324 | 7/1973 | Hyde . |
| 3,811,624 | 5/1974 | Giorgi ............................ 241/176 |
| 3,862,719 | 1/1975 | Muller ............................ 241/183 X |
| 3,863,847 | 2/1975 | Day et al. ...................... 241/79 X |
| 4,003,164 | 1/1977 | Carpenter, Jr. et al. ........ 241/183 X |
| 4,035,790 | 7/1977 | Farmer ............................ 241/36 |
| 4,036,440 | 7/1977 | Mäkilä et al. ................. 241/79 X |
| 4,044,695 | 8/1977 | Mackenzie et al. ..... 241/DIG. 38 X |
| 4,148,952 | 4/1979 | Nelson et al. ................ 241/3 X |
| 4,265,408 | 5/1981 | Voelskow . |
| 4,398,673 | 8/1983 | Gonnason . |
| 4,634,060 | 1/1987 | Riemann et al. ............... 241/79 X |
| 4,801,101 | 1/1989 | Dreyer et al. .................. 241/240 |
| 4,919,722 | 4/1990 | Vazquez et al. . |
| 4,926,601 | 5/1990 | Musschoot ...................... 241/183 X |
| 4,949,907 | 8/1990 | Bogdanov et al. ............. 241/176 X |
| 4,995,561 | 2/1991 | Yukimi .......................... 241/183 X |

Primary Examiner—Mark Rosenbaum
Assistant Examiner—Frances Chin
Attorney, Agent, or Firm—Klarquist, Sparkman, Campbell, Leigh & Whinston

[57] ABSTRACT

A method and apparatus for recycling wallboard employs a tumbling barrel for receiving wallboard pieces and metal weights. The tumbling barrel is sealed and the barrel is rotated so as to drop the weights against the wallboard. Once the materials are separated into gypsum and relatively large pieces of paper, the barrel doors are opened and the materials are transferred to a vibrating conveyor including a number of filtering screens for segregating the gypsum into consistently sized particles. A screen across the conveyor prevents the paper from continuing beyond a trap point. A chute transfers the paper particles to a paper collection bin while various sized gypsum particles are collected at the end of the conveyor in several bins according to size.

13 Claims, 7 Drawing Sheets

METHOD FOR RECYCLING WALLBOARD

This invention relates to a recycling method and apparatus and more particularly to a method and apparatus for recycling wallboard by separating the gypsum and paper facing components.

BACKGROUND OF THE INVENTION

Wallboard, a common construction material, comprises a gypsum core sandwiched between two layers of paper. Manufacturers and vendors of wallboard as well as builders employing wallboard in their construction projects typically generate wallboard scrap as a result of trimming board pieces to fit a particular application. Substantial amounts of scrap are also produced in the demolition of buildings. With ever increasing scarcity of dump space and elevated dumping fees, a significant expense can be incurred in disposing of the scrap material. Moreover, some general purpose dumps do not accept wallboard fragments, requiring disposal in special hazardous waste sites.

Increased disposal costs raise the desirability of recycling the gypsum and paper within the wallboard. Not only would the disposal problem be solved but also selling the recycled components could generate additional income. Prior attempts at recycling wallboard have included processing the gypsum board through a hammer mill to pulverize the gypsum and remove the paper facings. However, such methods are undesirable in that the hammer mill finely pulverizes the paper making separation of the gypsum and paper difficult or impossible. The resulting mixture is unusable. Reducing the speed of operation of the hammer mill as an attempt to resolve this pulverizing problem has not been effective.

Another attempt at recycling wallboard comprised passing the board fragments through a shredder, for example a garden-type shredder or grinder. However, this technique still does not produce a consistent output of material which is well adapted for separation.

Another drawback of prior recycling methods and apparatus relates to the considerable amount of gypsum dust produced during crushing which causes a potential health hazard for workers who breath the dust.

SUMMARY OF THE INVENTION

A wallboard recycling method and apparatus in accordance with the present invention employs a tumbling barrel mounted so as to be driven in a rotary fashion. The barrel is provided with a door through which gypsum board fragments and weights such as metal scrap are inserted. The interior surface of the barrel carries a number of baffles or fins for aiding in a process of breaking up the wallboard. Once the board and weights are placed within the barrel, the barrel is closed, providing a seal for preventing gypsum dust from escaping during the process, and the barrel is then rotated at a fairly low speed for a period of time until the gypsum and paper are separated. The gypsum, paper and weights are then removed from the tumbling barrel and placed on a vibrating conveyor provided with a number of screens and traps for segregating the constituent materials. The gypsum falls into one or more collection bins through a series of screens while the vibrating action of the conveyor causes the paper to collect at a trap and fall off into another collection bin. The weights used in the crushing process may also be collected at a trap point and re-used. The process according to the present invention separates fairly large pieces of paper which are easily separable from the gypsum.

It is an object of the present invention to provide an improved method and apparatus for recycling wallboard.

It is another object of the present invention to provide an improved method and apparatus for recycling wallboard in a manner which minimizes dust problems.

It is another object of the present invention to provide an improved method and apparatus for producing recyclable wallboard constituents of consistent size.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DETAILED DESCRIPTION

Figure 1:
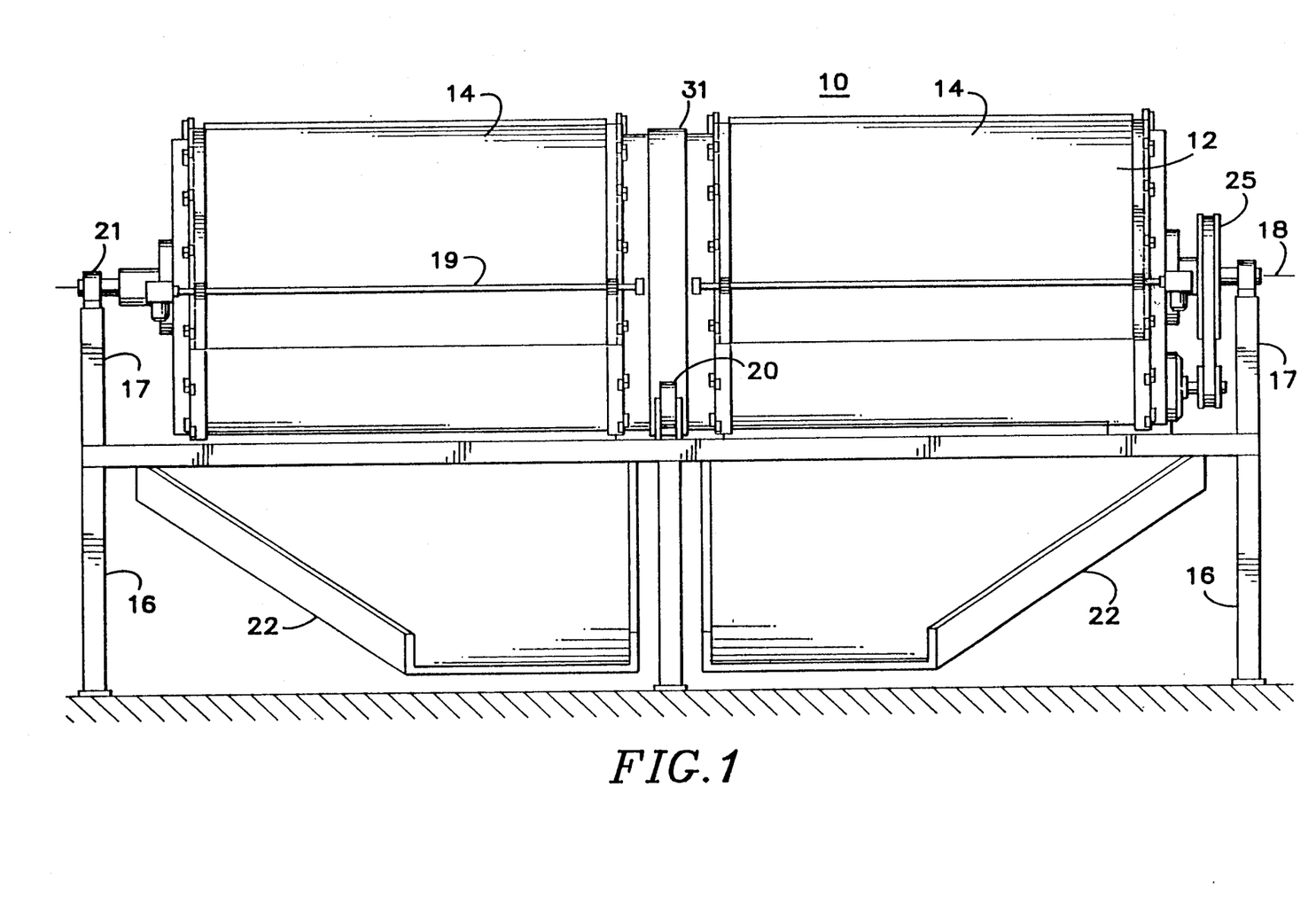
FIG. 1 is an elevational view of tumbling apparatus employed according to the present invention.
Figures 2, 8:
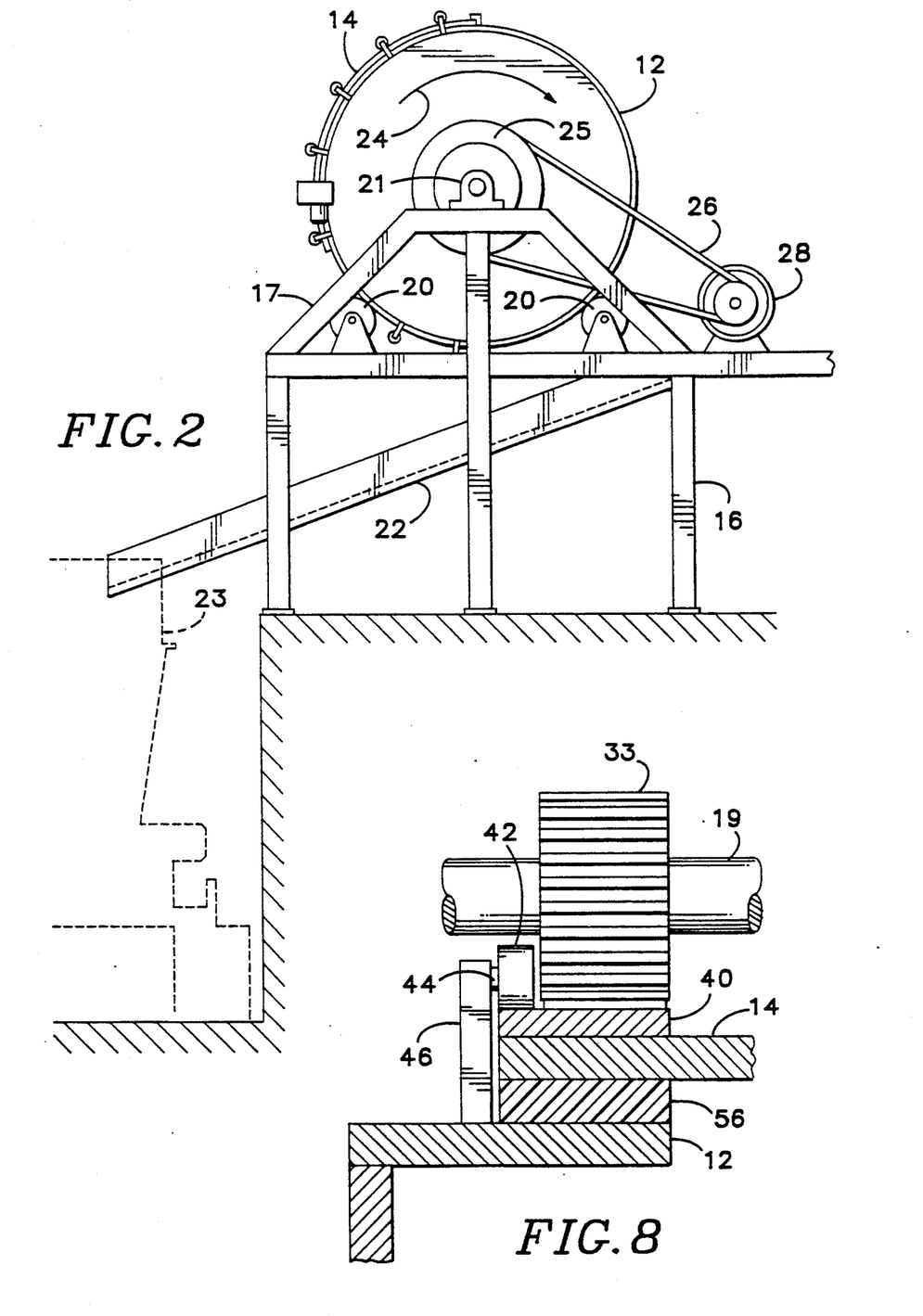
FIG. 2 is a side view of the FIG. 1 tumbling apparatus.
FIG. 8 is a cross section of door closing drive mechanism taken along line 8—8 in FIG. 4.

Referring now to FIGS. 1 and 2, elevational and end views of apparatus 10 according to the present invention for recycling wallboard, the apparatus includes a tumbling barrel 12 having side doors 14 for providing sealable access to the barrel interior through which wallboard pieces and weights such as metal scrap may be inserted. Support frame 16 carrying support arms 17 rotatably mounts the barrel at ends of arms 17 for providing free rotation around horizontally disposed, longitudinal axis 18. The barrel is also supported centrally (and may be supported at each end) by front and rear rollers 20 mounted to the support frame. The rollers fit within a roller track 31 located around the circumference of the barrel. The barrel rotates about axis 18 on bearings 21 as driven by pulley 25 fixedly attached to one end of the barrel and receiving a drive chain or belt 26 driven by motor 28. The rotation direction is indicated by direction arrow 24 in FIG. 2. A dump table or chute 22 is substantially coextensive beneath the barrel and slants forwardly from the top of support frame 16 near the rear thereof and downwardly to the base of frame 16 at the front thereof for guiding material dumped from barrel 12 onto conveyor 23 for separation of material. The details and operation of conveyor 23 are subsequently described in conjunction with FIGS. 5, 6 and 7.

Figure 3:
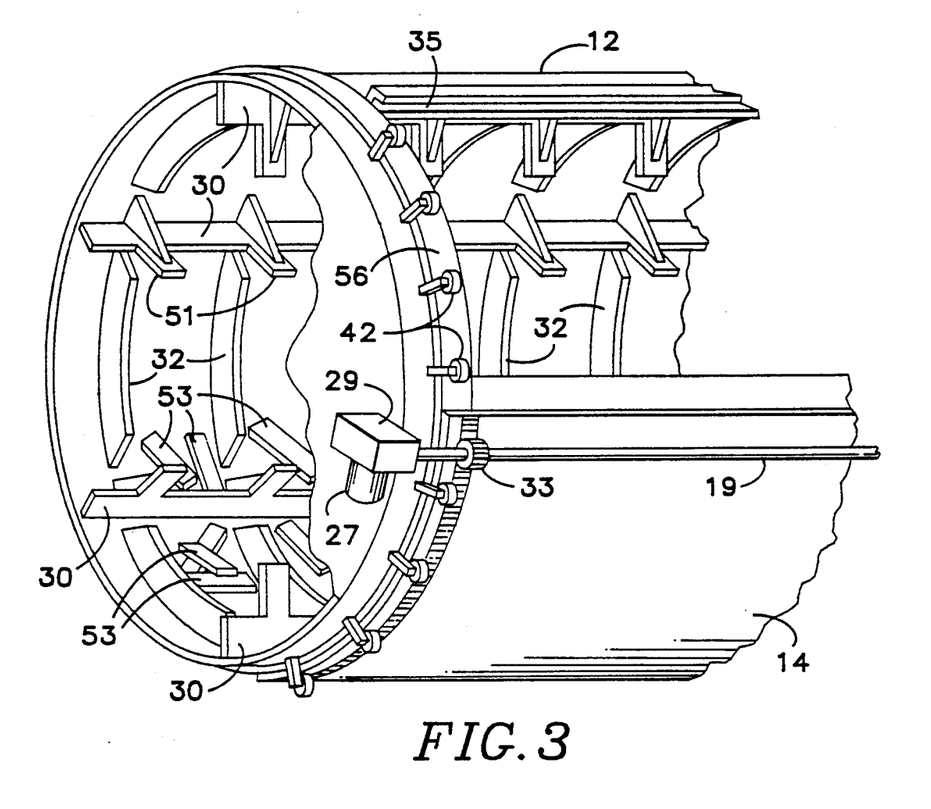
FIG. 3 is a perspective, cut-away view of the tumbling apparatus illustrating the interior thereof.

Referring now to FIG. 3, comprising a cut-away view of barrel 12 illustrating the interior thereof, a number of regularly spaced longitudinal baffle members 30 extend along the length of the interior of the barrel. The baffle members 30 are securely attached to the interior of the barrel and together with inwardly extending jibs 51 provide a resting point for loose weights 53 and wallboard material (not shown in this figure) so as to carry the weights and wallboard material up and around with the rotation of the barrel and then drop them centrally of the barrel in response to gravity. A series of regularly spaced circumferential fins 32 in line with the jibs 51 are placed between and substantially perpendicular to the orientation of the baffle members. The process of dropping allows weights 53 to impact the wallboard particles, smashing the particles against the interior surfaces of the barrel, thereby breaking the board into smaller pieces and separating the paper from the gypsum.

Figure 4:
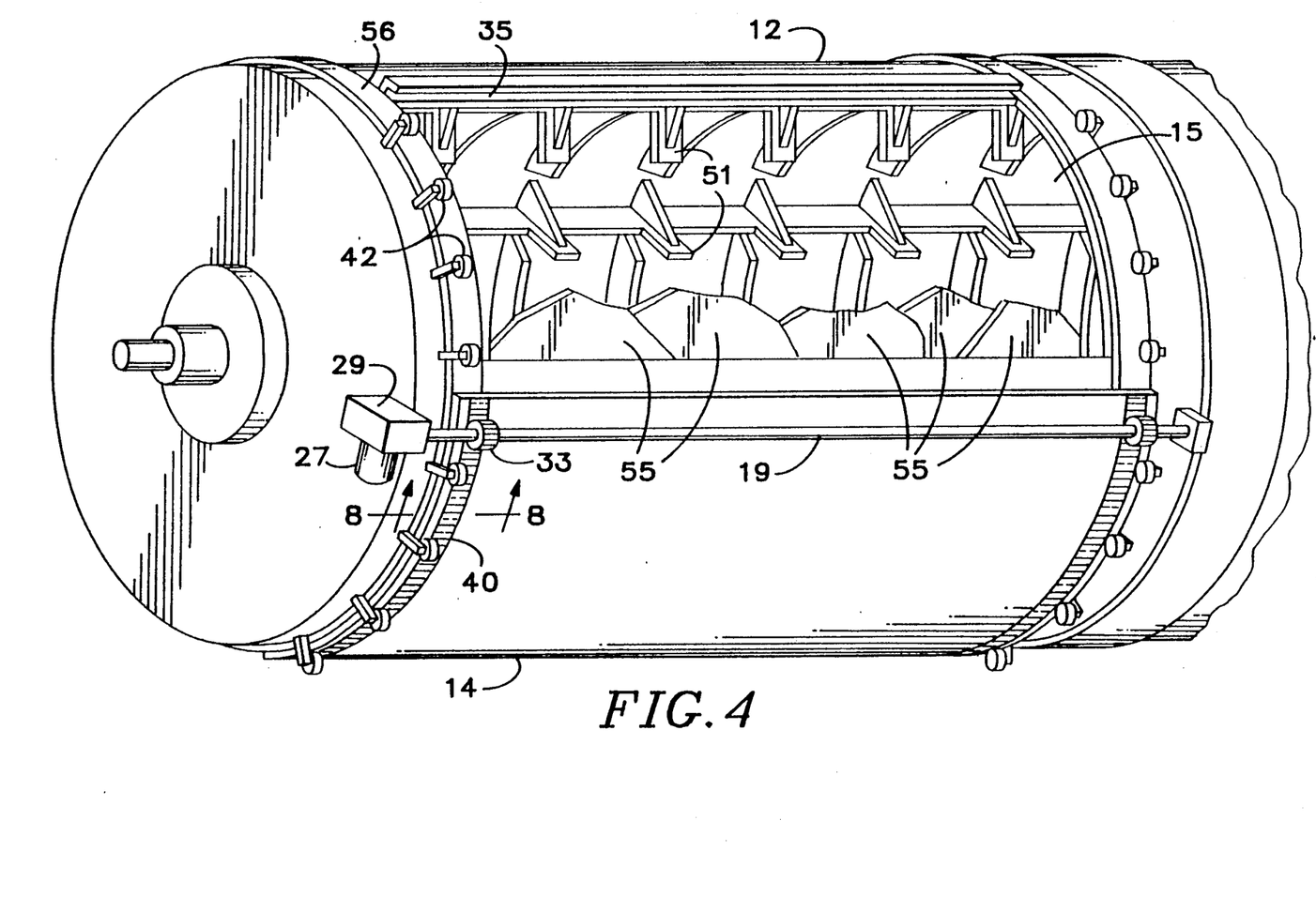
FIG. 4 is a perspective view of the tumbling apparatus illustrating placement of wall board pieces therewithin.

Referring to FIG. 4, the wallboard pieces 55 are shown inserted in tumbling barrel 12. Door 14, shown in an open position, normally covers opening 15, the door being semi-cylindrical in shape and slideably mounted so as to slide over and cover the opening 15. The door movement is driven by a rack and pinion system comprising a pair of pinions 33 engaging rack segments 40 mounted on the left and right door edges. A pinion is placed at the left and at the right edges of the door, supported and powered by drive shaft 19 which extends substantially across the length of door 14. Drive shaft 19 is powered by a hydraulic motor 27 mounted on one end of the barrel 12 with the motor rotation being translated to rotation of shaft 19 by right angle gearing box 29. To close the door, the motor is empowered so as to revolve shaft 19 thereby causing pinions 33 to turn and rack segments 40 and door 14 to slide toward a closed position on ultra high molecular weight plastic strips 56. The pinions continue to rotate when the door is being closed to slide the door until the door is firmly seated in slot 35 which extends longitudinally along the edge of opening 15. The slot may be ramped such that, as it receives the door, it tends to push the door more tightly against the strips 56 for substantially sealing the opening. Once the tumbling process is completed, the motor 27 is operated in a reverse direction causing the pinions 33 to rotate in a direction so as to cause door 14 to open, thereby allowing the contents of the barrel to be removed or dumped onto slanting table or chute 22 as the barrel is rotated.

Figure 5:
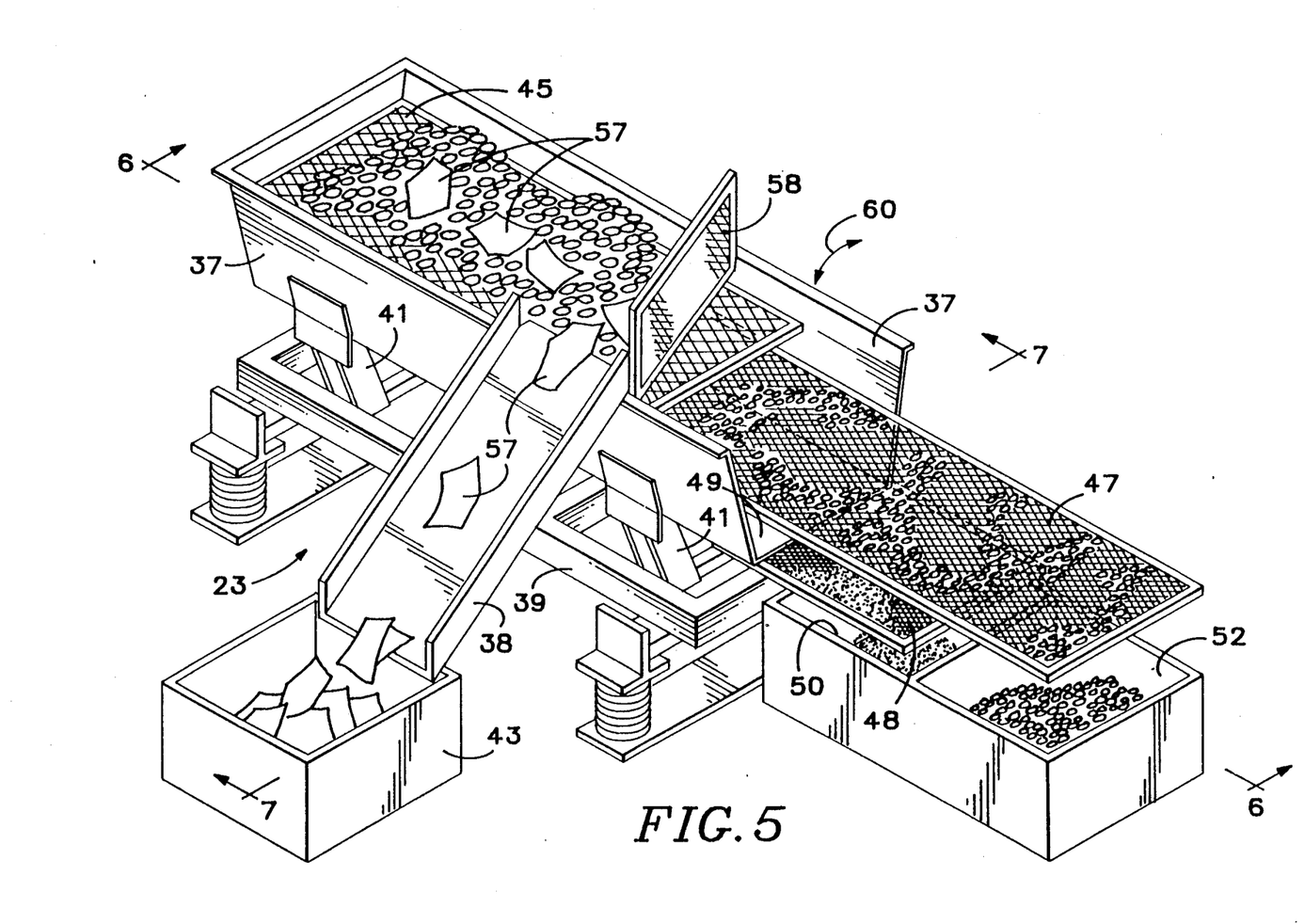
FIG. 5 is a view of a separating conveyor employed according to the present invention.
Figure 6:
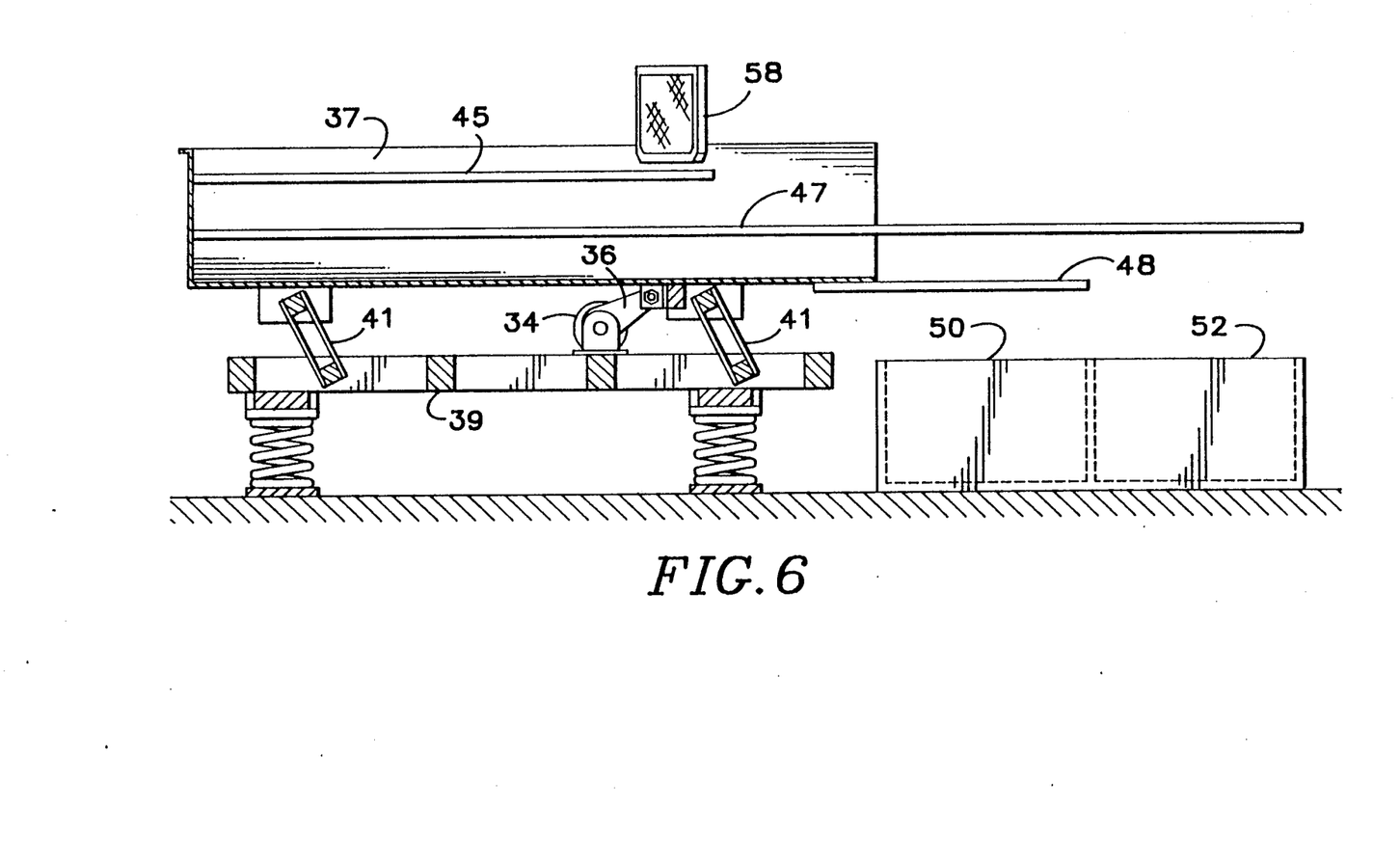
FIG. 6 is a longitudinal cross section of the FIG. 5 conveyor.
Figure 7:
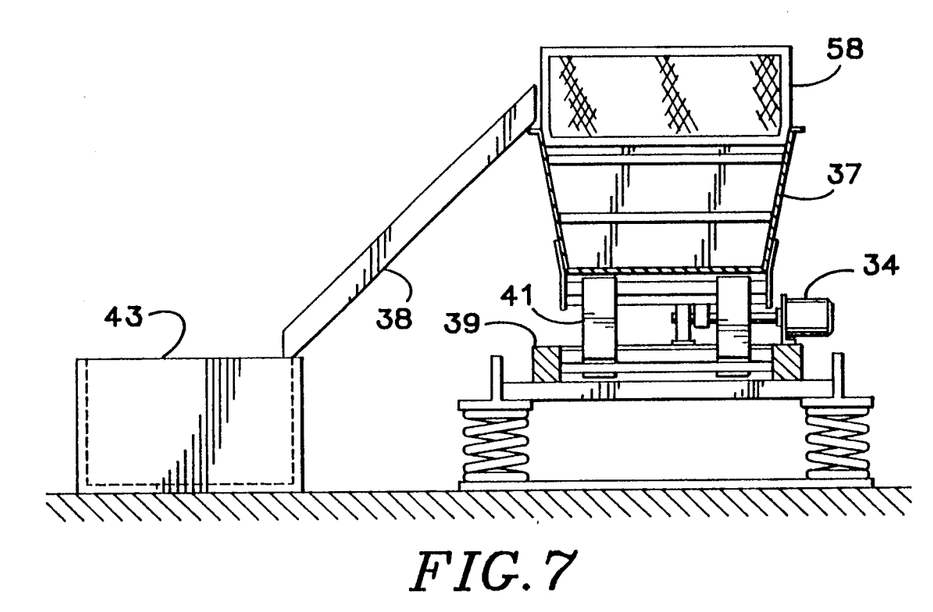
FIG. 7 is a cross section of the conveyor taken at 7—7 in FIG. 5.

Referring now to FIGS. 5-7, comprising views of separation or segregation apparatus employed according to the present invention, a vibrating conveyor 23 supports a number of substantially horizontal filtering screens for segregating the weights, gypsum, and paper particles. A vertical trap screen 58 mounted diagonally across conveyor pan assembly 37 prevents weights and paper from continuing past its location thereby sorting out these constituents. Pan assembly 37 is affixed to conveyor base 39 via rocker arms 41 which are adapted to rock conveyor pan assembly 37 with a substantially upward and somewhat forward motion with respect to conveyor base 39. The conveyor vibrates in a direction substantially along line 60 as driven by conveyor motor 34 and drive assembly 36 so as to move articles on the conveyor somewhat to the right in the FIG. 5 view. Alternatively, the conveyor can be slanted slightly downwardly to the right. The conveyor pan and drive mechanism may comprise a vibrating conveyor manufactured by Carrier Vibrating Equipment, Inc.

The conveyor further carries a chute 38 attached to the side of the pan assembly just forward (to the left) of where stop screen 58 spans the pan assembly on the side of the pan where the farthest downstream end of trap screen 58 is located. Chute 38 extends from the side of the pan assembly downwardly and serves to carry away paper material and metal weights caught by stop screen 58. Paper bin 43 is positioned beneath chute 38.

In operation, steel weights and paper particles collect at stop screen 58 and the vibrating action of the conveyor urges the paper particles along screen 58 and over the edge of pan assembly 37 into chute 38, allowing gravity to carry the paper particles into paper bin 43. The paper and steel trap 58 is oriented diagonally with respect to the length of pan assembly 37 so as to guide the paper towards chute 38.

A number of screens are suspended substantially horizontally within the interior of pan assembly 37, in parallel relation with the pan bottom, to assist in the separation process. A first coarse screen 45 is positioned nearest the top edge of the conveyor pan and extends from a closed end of the conveyor pan to slightly past trap 58. The coarse screen 45 is chosen with apertures which allow substantially all the gypsum particles to fall therethrough while preventing the weights and paper pieces from passing. Also positioned within the pan assembly a distance below the coarse screen is a medium screen 47. The medium screen extends substantially the entire length of the pan assembly and for a distance beyond the end thereof. The medium screen openings are such that moderately sized and smaller gypsum particles will fall therethrough, but particles larger than a predetermined size will remain above the medium screen. The particles which fall through medium screen 47 are then allowed to fall to the conveyor pan bottom 49.

The vibrating action of the conveyor urges the various particles towards the open (right) end of pan assembly 37 wherein a fine screen 48 is positioned and extends outwardly from the open pan end for a short distance. The fine screen is such that only the finest particle sizes will pass therethrough. Placed beneath fine screen 48 is material collection bin 50 for receiving the particles of such size, the fine screen 48 extending so as to cover the entire top of fine bin 50. Placed next to fine bin 50 is bin 52 for receiving particles which are too coarse to pass through screen 48, i.e., moderate sized particles of gypsum. Medium screen 47 extends so as to cross over both fine bin 50 and medium bin 52. Any particles which were too large to pass through medium screen 47 but small enough to pass through coarse screen 45 will then fall off the end of medium screen 47, bypassing both fine bin 50 and medium bin 52. Another collection bin (not shown) is suitably located below the end of screen 47 so as to collect these moderately coarse materials if desired, as well as any steel pieces passing through screen 45.

While the illustrated embodiment employs a particular number of separation screens, it should be understood that a greater or lesser number of screens may be utilized to achieve the degree of particle separation desired.

Referring now to FIG. 8, a cross section of the barrel door drive mechanism taken along line 8—8 of FIG. 4, ultra high molecular weight plastic strips 56 line the opening 15 into the barrel 12. The strips provide a durable yet relatively low friction surface upon which door 14 slides. Rack segment 40 is welded to and is substantially coextensive with the edge of door 14 providing teeth for mating with of pinion 33 for powering the door open and shut. The outermost edge of the rack segment is smooth, extending along substantially the length of the rack where cam rollers 42 ride. Each cam roller 42 rotates about a shaft or pin 44 which is received by shaft support 46 attached to barrel 12. The cam rollers are provided to secure the door in place, i.e. in a rotational track.

Considering operation of the present invention, wallboard pieces 55 to be recycled are placed within barrel 12 together with a number of weights 53 which may comprise flat scrap steel or steel balls, after which the barrel doors 14 are closed. The barrel is then rotated for a relatively short time duration as it separates gypsum and paper, depending somewhat on the number of weights and the amount of wallboard material placed within the barrel. Twenty to thirty minutes is appropriate. The paper separates into fairly large pieces and the barrel should be emptied at this point. The rotation speed is fairly low, for example, approximately eleven rpm in a preferred embodiment, but should be under fifty rpm. After the tumbling has continued for a period sufficient to break up the wallboard pieces as described, the doors 14 are opened and the mixture is dumped out onto slanting table or chute 22 (FIG. 2) as the barrel continues to rotate. The conveyor 23 then receives the wallboard materials and usually some weights for separation. (Some of the weights may remain behind in the tumbling barrel and may not be carried to the conveyor. The others are later returned to the barrel.) In the illustrated embodiment, the conveyor is placed below the base of the tumbling apparatus so as to receive the recycled material directly from the barrel as delivered by slanting table or chute 22.

The vibrating conveyor 23 urges the weights and material from the closed end of the pan assembly of the conveyor towards the open (right) end thereof. The screen 58 traps the paper and any steel weights while the gypsum particles fall through coarse screen 45. Almost all of the paper comprising comparatively large pieces 57 collects at the trap screen and is urged down paper chute 38 into paper collection bin 43. Various sized gypsum pieces continue down the conveyor toward the open end of pan assembly 37 with the moderate size pieces remaining above the medium screen and smaller pieces falling therebelow. The fine screen sifts out the finest particles into fine bin 50 while larger particles fall into medium bin 52. Still larger sized particles of gypsum then fall off the end of medium screen 47 into yet another bin. The gypsum can be re-used to form wallboard and for other purposes.

Tumbling the wallboard according to the present invention is advantageous in that the paper facing of the wallboard is removed in relatively large pieces. These large pieces are easy to separate, and the vibrating motion of the conveyor is such as to remove the paper at the trap point. The method and apparatus also generates gypsum particles of consistent size, providing reproducible recycling results.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:

1. A method for recycling wallboard wherein the wallboard comprises gypsum and paper, the method comprising the steps of:
   placing the wallboard in a tumbling apparatus having an inner wall;
   placing in the tumbling apparatus with the wallboard a plurality of loose removable weights sized so as to be capable of impacting against said inner wall when said tumbling apparatus is rotated; and
   moving said tumbling apparatus for causing the weights to impact against the wallboard as the wallboard contacts said inner wall, thereby to separate the gypsum from the paper.

2. The method according to claim 1 wherein said step of moving the tumbling apparatus comprises rotating said tumbling apparatus at a low speed below approximately fifty rpm.

3. The method according to claim 1 wherein said step of moving the tumbling apparatus comprises rotating the tumbling apparatus at a speed on the order of approximately eleven rpm.

4. The method according to claim 1 wherein the step of placing weights in the tumbling apparatus comprises placing flat steel scrap in said tumbling apparatus.

5. The method according to claim 1 wherein the step of placing weights in said tumbling apparatus comprises placing steel balls in said tumbling apparatus.

6. The method according to claim 1 further comprising the step of segregating the gypsum and paper after said moving step is completed.

7. The method according to claim 6 wherein said step of segregating comprises the substeps of:
   removing the gypsum and paper from the tumbling apparatus;
   placing the gypsum and paper on a vibrating screen;
   vibrating said screen to sift the gypsum through the screen; and
   removing the paper from the surface of the screen.

8. The method according to claim 7 wherein said vibrating screen vibrates principally in an up and down direction.

9. The method according to claim 7 including conveying said gypsum and paper along said screen, wherein said removing of said paper comprises trapping said paper at a location on said screen.

10. The method according to claim 1 further comprising the step of substantially sealing said tumbling apparatus to prevent dust from escaping from said tumbling apparatus during said moving step.

11. The method of claim 1 further including the step of removing the gypsum, paper, any remaining wallboard and at least some of said weights from said tumbling apparatus.

12. The method of claim 11 further including the step of further processing the gypsum, paper, remaining wallboard and weights by separating out the weights.

13. The method of claim 11 further including the step of further processing the gypsum, paper and remaining wallboard to separate the gypsum from the paper.

* * * * *